United States Patent [19]

Page

[11] Patent Number: 4,823,937

[45] Date of Patent: Apr. 25, 1989

[54] AUGER INCLUDING A STEP CONTRUCTION DESIGNED FOR ATTACHMENT THERETO

[76] Inventor: Rene Page, Box 55, Pickardville, Alberta, Canada, T0G 1W0

[21] Appl. No.: 180,569

[22] Filed: Apr. 12, 1988

[51] Int. Cl.$^4$ ............................................. B65G 33/00
[52] U.S. Cl. .................................. 198/657; 198/319; 198/860.3
[58] Field of Search .................... 198/860.3, 657, 319, 198/320, 318

[56] References Cited

U.S. PATENT DOCUMENTS

| | | |
|---|---|---|
| 1,331,495 | 2/1920 | Gibson . |
| 1,563,528 | 12/1925 | Rubio . |
| 2,630,905 | 3/1953 | Howe . |
| 2,831,566 | 4/1958 | Beldin et al. ................... 198/319 X |
| 4,036,411 | 7/1977 | Westhoff . |

FOREIGN PATENT DOCUMENTS

| | | | |
|---|---|---|---|
| 1163633 | 9/1969 | United Kingdom | ............... 198/657 |
| 115935 | 8/1984 | United Kingdom | ............... 198/657 |
| 2136757 | 9/1984 | United Kingdom | ............... 198/657 |

*Primary Examiner*—Frank E. Werner
*Assistant Examiner*—James R. Bidwell
*Attorney, Agent, or Firm*—Adrian D. Battison; Stanley G. Ade; Murray E. Thrift

[57] ABSTRACT

A step construction for an auger tube comprises a clamp which clamps around the auger tube at a position spaced from the hopper at the lower end of the auger tube. A flat step member is pivotally coupled to the clamp and includes a leg at an end remote from the clamp with a leg having a concave lower surface for sitting over the upper surface of the auger tube. The angle of the step relative to the auger tube can be adjusted by sliding the leg up and down within a sleeve attached to the step. The step can thus be readily attached to the auger tube and provides a secure footing for the user to stand on the auger tube to observe operation of the material within the hopper.

9 Claims, 2 Drawing Sheets

AUGER INCLUDING A STEP CONTRUCTION DESIGNED FOR ATTACHMENT THERETO

BACKGROUND OF THE INVENTION

This invention relates to an auger of the type comprising a circular cylindrical tube through which material is transported from a hopper at a lower end to an upper end.

In farm work augers are very common in transporting grain and other similar materials. In many case the auger includes a hopper arrangement at the lower end with an exposed portion of the interior flight projecting from the end of the auger into the hopper for engaging the material fed into the hopper and feeding it into the auger tube. It is often required for the operative to be in a position to watch the material feeding into the hopper to ensure that it is properly controlled. This often involves the operative bending over the hopper or standing on the edge of the hopper or standing on an upper part of the tube looking down into the hopper. In all of these cases the operative is precariously balanced and in danger of slipping or tripping into the hopper area. Of all farm equipment the feed end of the auger is perhaps the most dangerous and the cause of the largest number of accidents in view of these unsafe practices.

SUMMARY OF THE INVENTION

It is one object of the present invention therefore to provide a step arrangement for mounting upon an auger to enable the operative to be positioned more safely at the lower end of the auger for observing the operation of the auger without danger of tripping or sliding into the feed end of the auger.

According to a first aspect of the invention therefore there is provided a step construction comprising a step member having a substantially horizontal surface on which feet of a user can stand, a clamp member shaped to surround and clamp upon a circular cylindrical body, a pivot coupling attached to said step member and to said clamp member such that the step member extends outwardly away from one side portion of the clamp member and is pivotal relative thereto, and a support member extending downwardly from said step member at a position spaced from the clamp member and including means at a lower end thereof arranged to engage and rest upon a portion of the circular body spaced from the clamp member and means for adjusting the distance between said step member and said lower end of said support member.

According to a second aspect of the invention therefore there is provided an auger comprising a circular cylindrical auger tube inclined from a lower end to an upper end thereof, transport means extending along the tube on the interior of the tube for transporting material along the tube from an exposed portion at the lower end of the tube to said upper end, a hopper on the lower end of the tube for receiving material to be transported and confining it for engagement by said exposed portion, and a step mounted on top of the tube and defining a substantially horizontal surface arranged to receive the feet of a user and extending at a height above the hopper.

The device therefore provides a simple step which can be readily attached to the auger tube and can be properly maintained in position and yet can be simply and readily adjusted when the angle of the auger tube is modified to vary the feed position relative to the lower end. The support member can merely be a curved body on the underside which engages the upper surface of the auger tube so that its position can be readily moved as the angle of the step is changed by varying the position of a strut or leg forming the support member.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
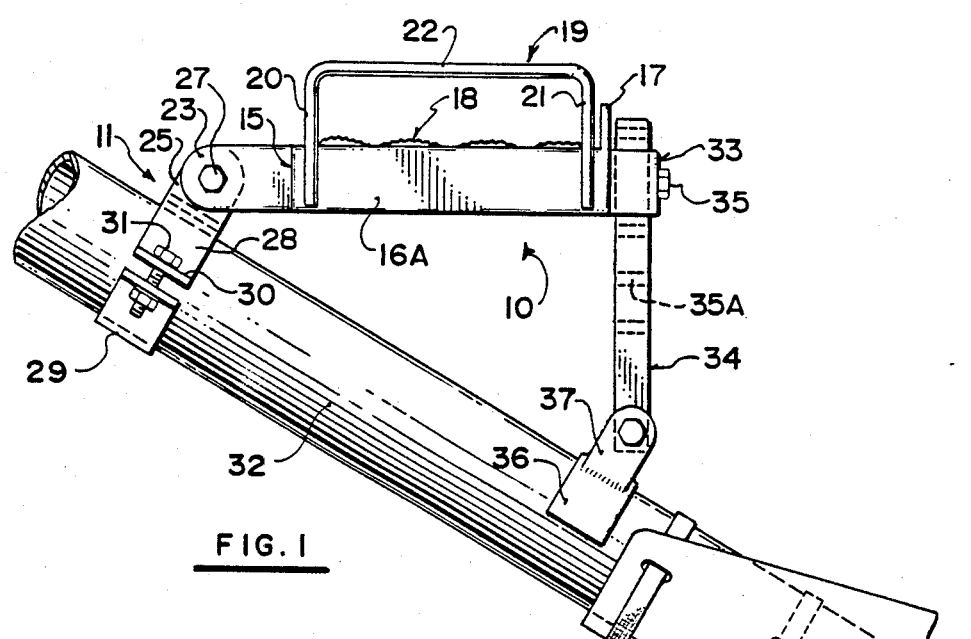
FIG. 1 is side elevational view of an auger tube having the step construction mounted thereon.
Figure 2:
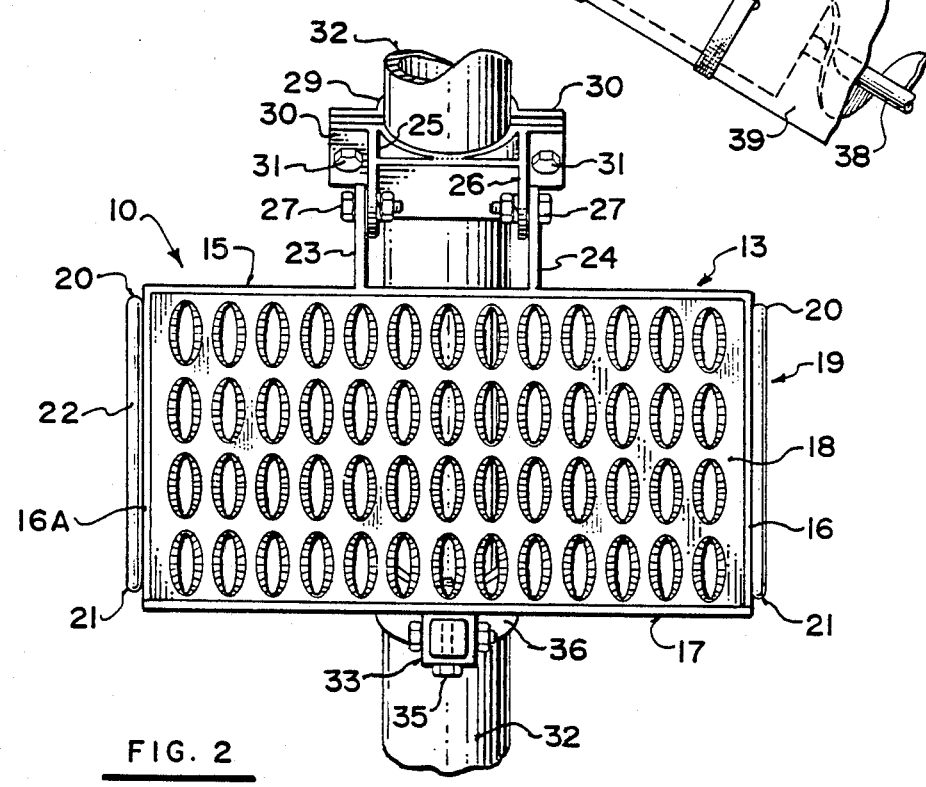
FIG. 2 is a top plan view of the step of FIG. 1.
Figure 4:
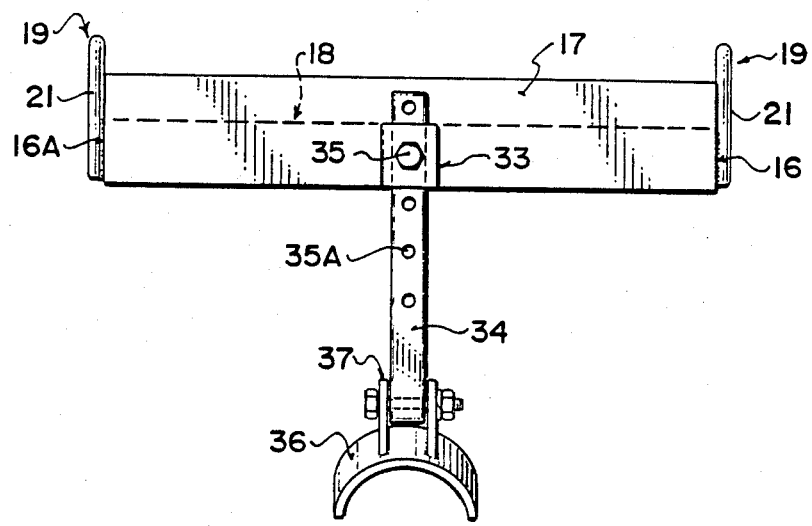
FIG. 4 is a front elevational view of the step of FIG. 1.
Figure 3:
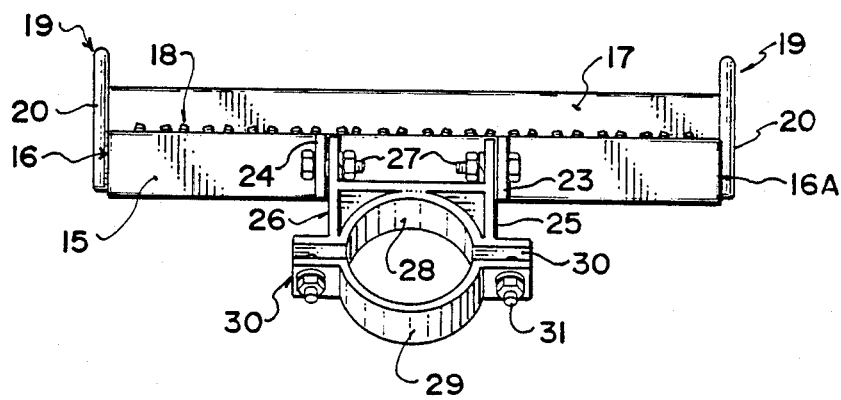
FIG. 3 is a rear elevational view of the step of FIG. 1 removed from the auger tube.

The step construction of the invention comprises a step member generally indicated at 10, a clamping member for the step indicated at 11 and a support member generally member 10.

The step member comprises an outer rim 13 which is formed of four flat straps. A rearward strap 15 and two side straps 16 and 17 each have the same height of approximately one inch. A forward strap 17 has an increased height such that it can define a forward portion and also an upstanding toe engaging portion of the step of a height approximately one or two inches above a horizontal support surface of the step. The horizontal support surface is indicated at 18 and its sides to upper edges of the rear and side straps and to a midheight of the front strap 17. The step member thus formed has a front to rear extent of the order of one foot and a transverse dimension of the order of eighteen inches to two feet thus providing sufficient area for the feet of the user to be readily received.

Each of the side straps 16 and 17 has welded thereto a loop member 19 defined by upstanding legs 20 and 21 and a horizontal cross member 22 thus defining a handle with the cross member 22 at a position of the order of three or four inches above the height of the step.

Attached to the rear strap 15 is a pair of outwardly extending struts 23 and 24 which act as a connection to the clamp 11. Each of the struts thus cooperates with an upstanding strut 25, 26 of the clamp member with a bolt coupling 27 extending therebetween so as to act as a pivot connection defined by the bolts 27 to allow the step to pivot relative to the clamp member. The clamp member comprises an upper half cylinder 28 and a lower half cylinder 29 each of which includes outwardly extending flanges 30 which can be pulled together by two pairs of bolts 31 to clamp the half cylinders around the auger tube 32. The upstanding struts 25 and 26 are welded to the upper half cylinder at its junction with the flanges 30 so that the struts 25 and 26 extend upwardly on either side of the auger tube 32.

On the outer face of the front straps 17 is welded a sleeve 33 through which can slide a square leg 34 defining the support member. A bolt 35 passes through an opening in the sleeve and through a chosen one of a plurality of holes 35A in the rod or leg 34 to hold the leg at a required height. On the lower end of the rod 34 is positioned a half cylindrical rest portion 36 which sits over the upper surface of the auger tube 32 and can rest thereon. The half cylinder 36 is pivotally coupled to the rod 34 by a clevis 37.

At a lower end of the auger tube 32 is an exposed portion of the flight 38 and a hopper member generally indicated at 39 which is usually a molded plastic member strapped onto the lower end of the auger for receiving and confining the material to be fed by the auger.

In operation the step construction is attached to the auger tube by releasing one or both of the bolts 31, feeding the half cylinders around the auger tube and clamping them into position at a required height on the auger tube so as to hold the step construction slightly above the hopper 39. The half cylinder 36 is then rested upon the upper surface of the auger tube at a position spaced downwardly from the clamp 11. The position of the leg 34 in the sleeve 33 is then adjusted in dependence upon the angle of the auger tube so that the step surface is approximately horizontal.

The positioning of the step just above the hopper enables the user to climb onto the step and to look over the hopper to observe the feeding operation. Whenever the angle of the auger tube is altered, the angle of the step can similarly be altered very readily by adjusting the screw clamp 35 and the rod 34.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger comprising a circular cylindrical auger tube inclined from a lower end to an upper end thereof, transport means extending along the tube on the interior of the tube for transporting material along the tube from an exposed portion at the lower end of the tube to said upper end, a hopper on the lower end of the tube for receiving material to be transported and confining it for engagement by said exposed portion, and a step mounted on top of the tube and defining a substantially horizontal surface arranged to receive the feet of a user and extending at a height above the hopper, the step comprising a step member having a substantially horizontal surface on which feet of a suer can stand, a clamp member shaped to surround and clamp upon a circular cylindrical boy, a pivot coupling attached to said step member and to said clamp member such that the step member extends outwardly away one side portion of the clamp member and is pivotal relative thereto, and a support member extending downwardly from said step member at a position spaced from the clamp member and including means at a lower end thereof arranged to engage and rest upon a portion of the circular body spaced from the clamp member and means for adjusting the distance between said step member and said lower end of said support member.

2. The invention according to claim 1 wherein the support member comprises a single leg extending vertically downwardly from said step member.

3. The invention according to claim 1 wherein said means at the lower end of said support member defines a concave surface facing downwardly to rest over an upper face of the circular cylindrical body.

4. The invention according to claim 3 wherein the concave surface has a peripheral extent not greater than one half of the circle so that it can be lifted away from the cylindrical body.

5. The invention according to claim 1 wherein the support member comprises a vertical leg having a part cylindrical member at said lower end thereof, said leg being slidable in a sleeve for adjustment of the distance between the part cylindrical member and the step member.

6. The invention according to claim 1 wherein the step member has said pivot coupling at one side thereof opposite to said support member.

7. The invention according to claim 1 wherein said clamp member comprises a cylindrical clamp which can be drawn tightly to clamp around the cylindrical body and includes a pair of upstanding struts defining said pivot coupling.

8. The invention according to claim 1 wherein the step member includes an upstanding bar across a front edge thereof adjacent said support member for engaging toes of the feet of the user.

9. The invention according to claim 1 wherein the step member includes a pair of loop members each arranged at a respective side of the step member and defining a handle thereon.

* * * * *